(12) United States Patent
Proctor et al.

(10) Patent No.: US 7,048,496 B2
(45) Date of Patent: May 23, 2006

(54) TURBINE COOLING, PURGE, AND SEALING SYSTEM

(75) Inventors: Robert Proctor, West Chester, OH (US); James Patrick Dolan, Cincinnati, OH (US); John Christopher Brauer, Lawrenceburg, IN (US); Christopher Charles Glynn, Hamilton, OH (US); Kenneth Martin Lewis, Middletown, OH (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 10/285,891

(22) Filed: Oct. 31, 2002

(65) Prior Publication Data

US 2004/0086377 A1    May 6, 2004

(51) Int. Cl.
*F01D 25/12* (2006.01)

(52) U.S. Cl. .................... 415/115; 415/116; 415/174.5; 415/69; 416/95; 416/128; 416/204 A

(58) Field of Classification Search ................ 415/115, 415/116, 174.5, 230, 68, 69; 416/126, 128, 416/95, 204 A; 60/268, 39.162

See application file for complete search history.

(56) References Cited

U.S. PATENT DOCUMENTS

| 4,916,892 | A |   | 4/1990  | Pope |
| 5,079,916 | A |   | 1/1992  | Johnson |
| 5,131,813 | A |   | 7/1992  | Przytulski et al. |
| 5,131,814 | A |   | 7/1992  | Przytulski et al. |
| 5,307,622 | A | * | 5/1994  | Ciokajlo et al. ......... 60/39.162 |
| 5,361,580 | A |   | 11/1994 | Ciokajlo et al. |
| 6,619,030 | B1 | * | 9/2003 | Seda et al. ................. 60/226.1 |
| 6,684,626 | B1 | * | 2/2004 | Orlando et al. ............... 60/268 |

* cited by examiner

*Primary Examiner*—Ninh H. Nguyen
(74) *Attorney, Agent, or Firm*—Adams Evans P.A.; William Scott Andes

(57) ABSTRACT

A rotor system for a gas turbine engine is provided having an outer rotor which includes an annular outer spool that comprises at least one ring portion of increased thickness with respect to the remainder of the outer spool, attached to a relatively thinner, axially extending arm portion. A plurality of outer turbine blades are attached to the ring portion of the outer spool and extend radially inwardly into a working gas flowpath of the engine. A casing surrounds the outer spool and defines an annular cavity between the casing and the outer spool, which is sealed by forward and aft brush seals at the forward and aft ends thereof. At least one inlet port is formed through the casing for admitting a flow of cooling air to the annular cavity. Means are provided for directing this cooling air flow to the ring portion of the outer spool.

14 Claims, 5 Drawing Sheets

TURBINE COOLING, PURGE, AND SEALING SYSTEM

BACKGROUND OF THE INVENTION

This invention relates generally to gas turbine engines and more particularly to counter-rotating turbines for gas turbine engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan.

In one type of turbofan engine, a counter-rotating low pressure turbine is provided downstream of the core engine for driving forward and aft counter-rotating fan rotors. Each of the counter-rotating turbine rotors includes a plurality of turbine blades extending therefrom in predetermined numbers of axial stages.

The components of the counter-rotating turbine must be able to withstand the high temperature environment in which they operate. This often requires that they be cooled, for example with relatively cooler air flow extracted from an upstream location in the engine. A satisfactory turbine cooling system must be tolerant of several factors which may cause deviations from the design condition. These factors include the possibility of a broken cooling air delivery pipe or failed sealing components, the effect of manufacturing tolerances, engine maneuvers and resultant impact on seal clearances, and cavity purge requirements to prevent flowpath ingestion.

Accordingly, there is a need for a counter rotating turbine having robust sealing and cooling provisions.

BRIEF SUMMARY OF THE INVENTION

The above-mentioned need is met by the present invention, which provides a rotor system for a gas turbine engine having an outer rotor which includes an annular outer spool that comprises at least one ring portion of increased thickness with respect to the remainder of the outer spool, attached to a relatively thinner, axially extending arm portion. A plurality of outer turbine blades are attached to the ring portion of the outer spool and extend radially inwardly into a working gas flowpath of the engine. A casing surrounds the outer spool and defines an annular cavity between the casing and the outer spool, which is sealed by forward and aft brush seals at the forward and aft ends thereof. At least one inlet port is formed through the casing for admitting a flow of cooling air to the annular cavity. Means are provided for directing this cooling air flow to the ring portion of the outer spool.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION.

Figure 1:
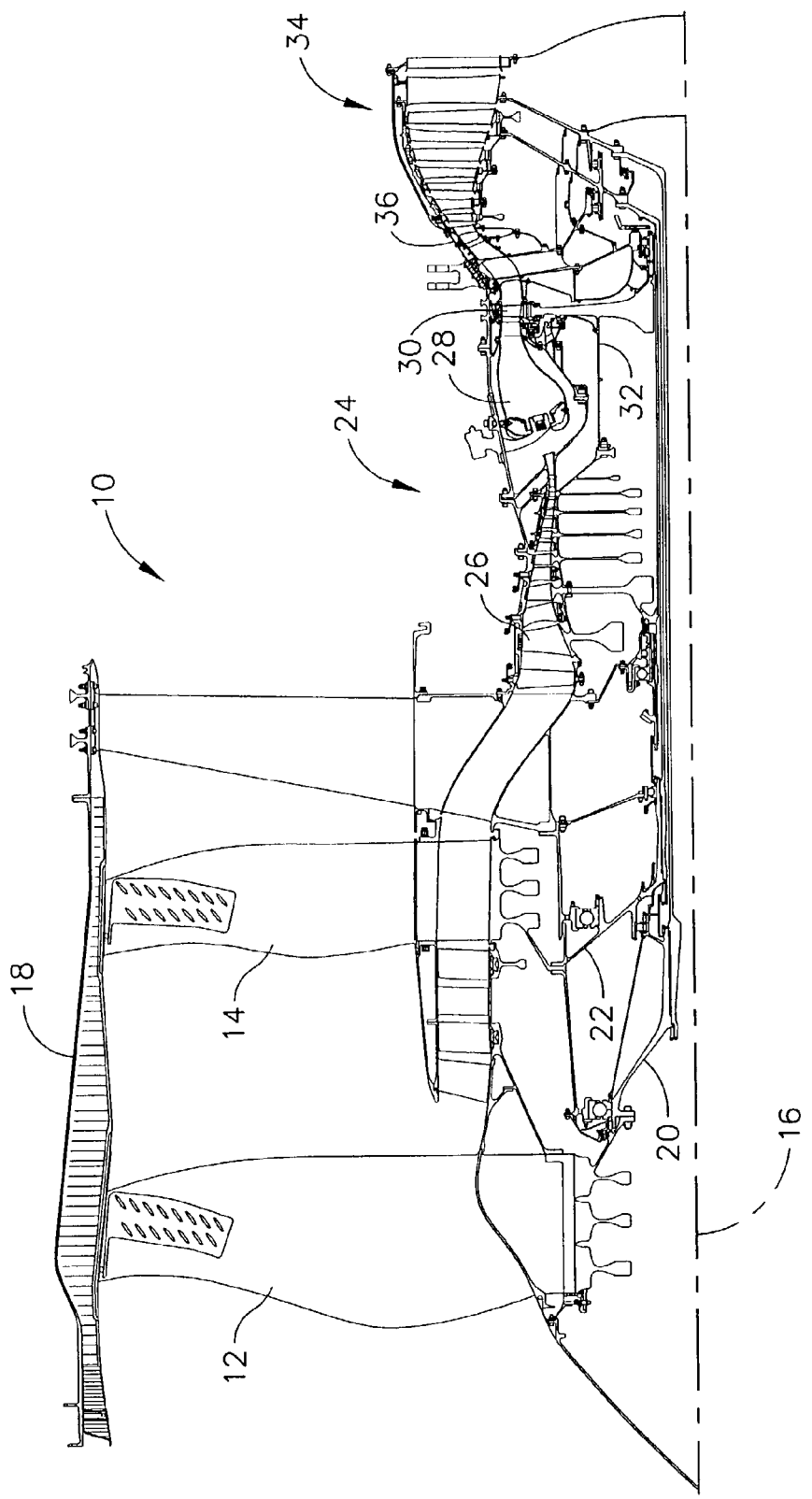
FIG. 1 is a schematic half-sectional view of a gas turbine engine having counter-rotating fans powered by a counter-rotating turbine constructed in accordance with the present invention.

Referring to the drawings wherein identical reference numerals denote the same elements throughout the various views, FIG. 1 Illustrates an exemplary aircraft gas turbine engine 10 having a front fan 12 and an aft fan 14 disposed about a longitudinal centerline axis 16. The terms "front fan" and "aft fan" are used to indicate that one of the fans is axially forward of the other fan. The pair of fans may be disposed at the forward end of the engine 10 as illustrated, or at its aft end. The fans 12 and 14 include rows of fan blades disposed within a nacelle 18, with the blades being joined to respective rotor disks receiving power through a front fan shaft 20 joined to the front fan 12 and an aft fan shaft 22 joined to the aft fan 14.

Disposed downstream from the fans is a core engine 24 including a high pressure compressor (HPC) 26, combustor 28, and a high pressure turbine (HPT) 30 joined to the HPC 26 by a core rotor or shaft 32. The core engine 24 generates combustion gases which flow downstream therefrom to a counter-rotating low pressure turbine 34 which extracts energy therefrom for powering the fans 12 and 14 through their respective fan shafts 20 and 22.

Figure 2:
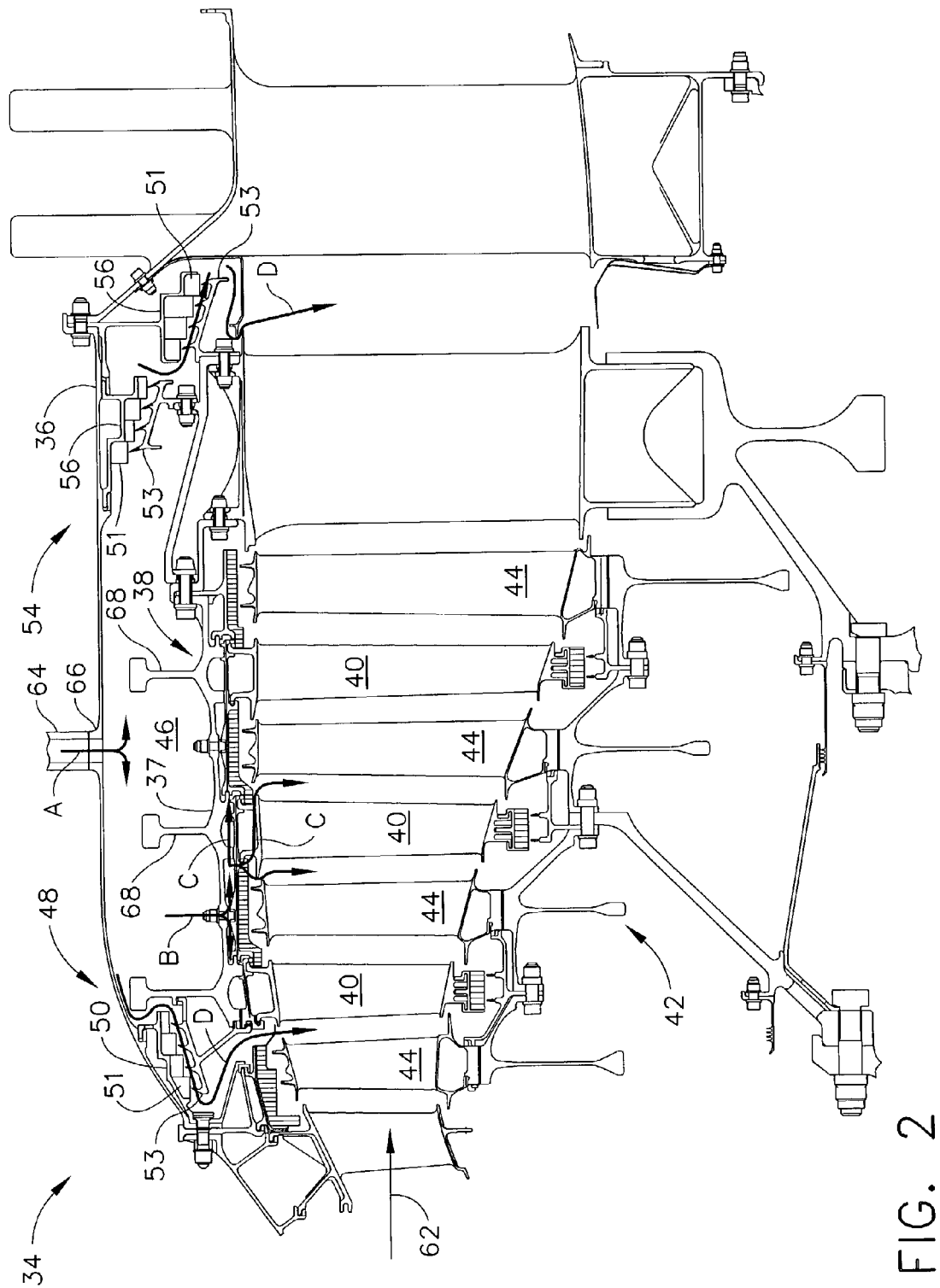
FIG. 2 is an enlarged schematic view of the counter-rotating turbine of FIG. 1.

The low pressure turbine 34 is illustrated in more detail in FIG. 2 and includes a stationary casing 36 joined to the core engine 24 downstream of the HPT 30. The low pressure turbine 34 includes an annular, radially outer rotor 38 disposed radially inwardly of the casing 36 which comprises a generally annular outer spool 37 having a plurality of circumferentially spaced apart outer turbine blades 40 extending radially inwardly therefrom in axially spaced apart blade rows or stages, three being illustrated for example. An annular, radially inner rotor 42 is disposed coaxially with the outer rotor 38 about the centerline axis 16 and radially inwardly thereof, and includes a plurality of circumferentially spaced apart inner turbine blades 44 extending radially outwardly therefrom in axially spaced apart blade rows or stages, three being shown for example, which are axially interdigitated with the outer blade stages, so that the blade stages of the respective outer and inner rotors 38 and 42 are disposed axially between respective stages of the other rotor. The blades 40 and 44 are configured for counter-rotation of the rotors 38 and 42.

An annular cavity 46 is defined between the casing 36 and the outer spool 37. The annular cavity 46 is bounded at its radially inner boundary by the outer spool 37, at its axially forward end 48 by one or more forward seals 50, at its radially outer boundary by the casing 36, and at its axially aft end 54 by one or more aft seals 56.

In the illustrated example the forward and aft seals 50 and 56 are labyrinth seals comprising a stationary member 51, such as a honeycomb material, disposed in close proximity to a plurality of annular seal teeth 53. The forward and aft seals 50 and 56 prevent leakage of cooling air flow supplied to the annular cavity 46 into the working gas flowpath 62 at the forward and aft ends 48 and 54 of the annular cavity 46, as described in more detail below.

The forward and aft seals 50 and 56 may also be brush seals of a known type (not shown), each including a bristle pack attached along its radially outer edge to a stationary engine part with the radially inner, free ends of the bristles disposed in a sealing engagement with a sealing surface on a rotating engine part. Brush seals, if used, rely upon the tortuous flow path created between the bristles to reduce gas flow therethrough.

The annular cavity 46 is supplied with cooling air through a plurality of supply pipes 64 disposed around the circumference of the casing 36 and connected to a plurality of inlet ports 66 formed in the outer casing 36. A portion of one of the supply pipes 64 is shown in FIG. 2. If desired, the ports 66 may be angled with respect to the engine axis 16 to cause swirling of the incoming cooling air in a circumferential direction. This reduces the relative temperature of the cooling air flow at the outer spool 37. Furthermore, the amounts of cooling air used and swirl may be selected to control the operating clearances between the counter-rotating inner and outer rotors, which in turn controls the amount of purge air flow escaping into the working gas flow path 62.

The number and diameter of the supply pipes 64 are chosen so that an adequate flow rate of cooling air will be supplied to the low pressure turbine 34 even if one of the supply pipes should fail. For example, if a number "n" of supply pipes 64 were calculated to be needed to supply the appropriate cooling air flow at a selected operating condition, then n+1 or more supply pipes 64 would actually be provided.

Figure 3:
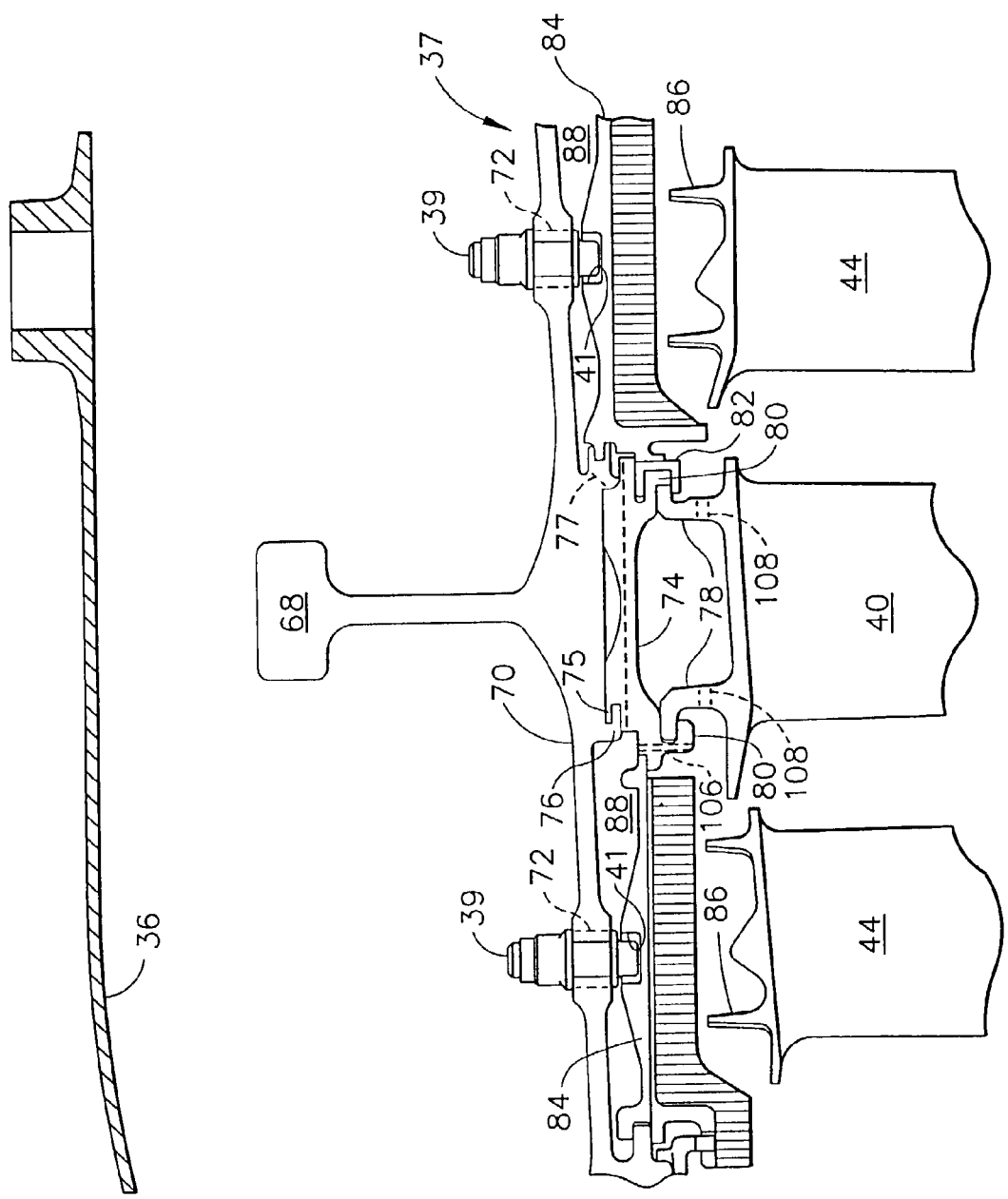
FIG. 3 is an enlarged schematic view of a portion of the outer spool of the counter-rotating turbine of FIG. 2, showing details of a first configuration of the blade mounting structures.

Referring to FIG. 3, the outer spool 37, which carries a plurality of radially inwardly extending outer turbine blades 40, is a generally annular component including one or more ring portions 68 which correspond to the axial locations of the outer turbine blades 40. The ring portions 68 are of increased thickness with respect to the remainder of the outer spool 37 and have a generally T-shaped cross-section, in order to be able to resist the hoop stresses generated by the body forces of the rotating outer turbine blades 40. The ring portions 68 are axially spaced apart and are connected to each other by relatively thinner, axially extending spool arm portions 70. A plurality of inlet holes 72 are formed through the spool arm portions 70. Since the presence of the inlet holes 72 cause stress raisers in the outer spool 37, the inlet holes 72 are disposed in the arm portions 70, away from the ring portions 68 which are already subject to high stresses. For example, the inlet holes 72 may be located approximately halfway between adjacent ring portions 68. In the illustrated example, it is noted that the inlet holes 72 are located axially in line with and circumferentially between the studs 39, described below.

A plurality of blade hangers 74 are attached to the outer spool 37. The blade hangers 74 are arcuate components which are attached by circumferential rails 75 to circumferential mounting hooks 76 formed in the ring portions 68 of the outer spool 37. The outer turbine blades 40 are then attached to the blade hangers 74. In the illustrated example, the outer turbine blades 40 include circumferential hooks 78 which are received in complementary circumferential rails 80 of the blade hangers and secured thereto by C-clips 82.

A plurality of arcuate sealing elements 84, such as the honeycomb seals illustrated in FIG. 3, are mounted to the outer spool 37, and are located axially between adjacent stages of the outer turbine blades 40. The sealing elements 84 cooperate with circumferential, radially extending seal teeth 86 formed at the radially outer ends of the inner turbine blades 44 to prevent leakage of working gas flowpath gases past the inner turbine blades 44. As seen in FIG. 2, an annular pocket 88 is enclosed between each sealing element 84 and the inner surface of the outer spool 37. One or more circumferential arrays of studs 39 are attached to the outer spool 37. The studs 39 are received in recesses 41 in the sealing elements 84. The studs 39 serve to transfer torque loads from the sealing elements 84 to the outer spool 37.

Figure 5:
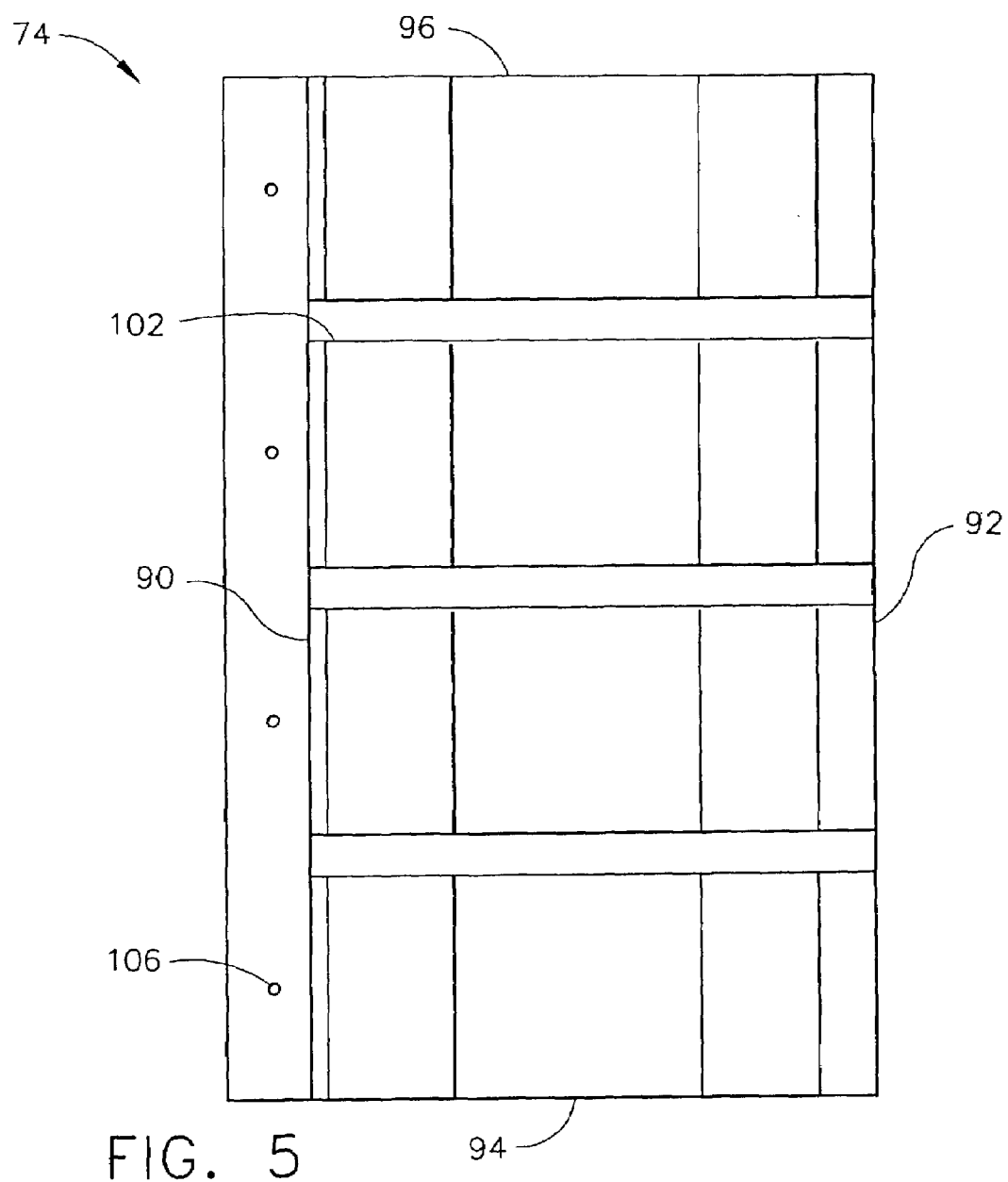
FIG. 5 is a top view of the blade hanger of FIG. 4.
Figure 4:
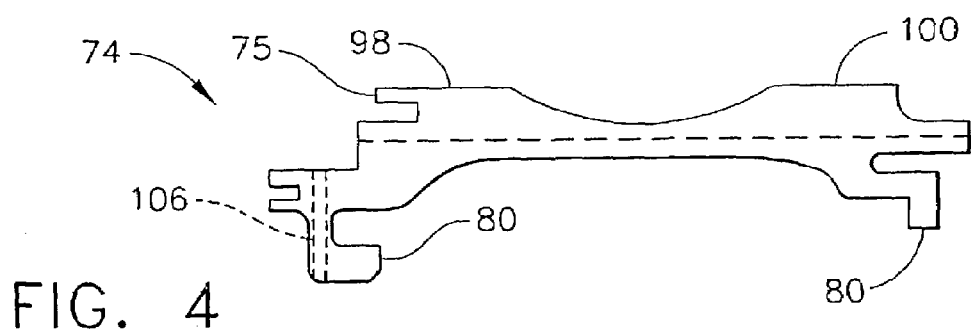
FIG. 4 is a side view of a blade hanger for use with the present invention.

FIGS. 4 and 5 show an exemplary embodiment of the blade hangers 74 in more detail. As explained above, the blade hangers 74 are generally arcuate components and may be formed by any known method, for example each blade hanger 74 may be a unitary casting. Each blade hanger 74 has a forward end 90, an aft end 92, a first circumferential end 94 and a second circumferential end 96. The blade hanger 74 includes axially spaced-apart forward and aft raised bosses 98 and 100, which extend from the first circumferential end 94 to the second circumferential end 96. The forward and aft bosses 98 and 100 bear against the inner surface of a ring portion 68 of the outer spool 37 when the low pressure turbine 34 is assembled. A plurality of longitudinally extending slots 102 are formed through the forward boss 98, the aft boss 100, and the radially outer surface of the blade hanger 74. In the illustrated example the depth of the slots 102 in the radial direction is sufficient to form a flow passage between the outer spool 37 and the blade hanger 74. A plurality of generally radially extending cooling holes 106 are formed through the thickness of the blade hanger 74 near its forward end 90. These cooling holes 106 allow the passage of cooling air flow from the annular pockets 88 to the outer ends of the outer turbine blades 40.

Other configurations may be used to provide a flowpath past the bosses 98 and 100 and the ring portions 68. For example, a number of slots 77 (see FIG. 3) could be formed in the circumferential mounting hooks 76 of the outer spool 37 to allow cooling air flow therethrough. These slots could be used instead of, or in combination with, the slots 102 in the blade hangers 74 described above.

Figure 6:
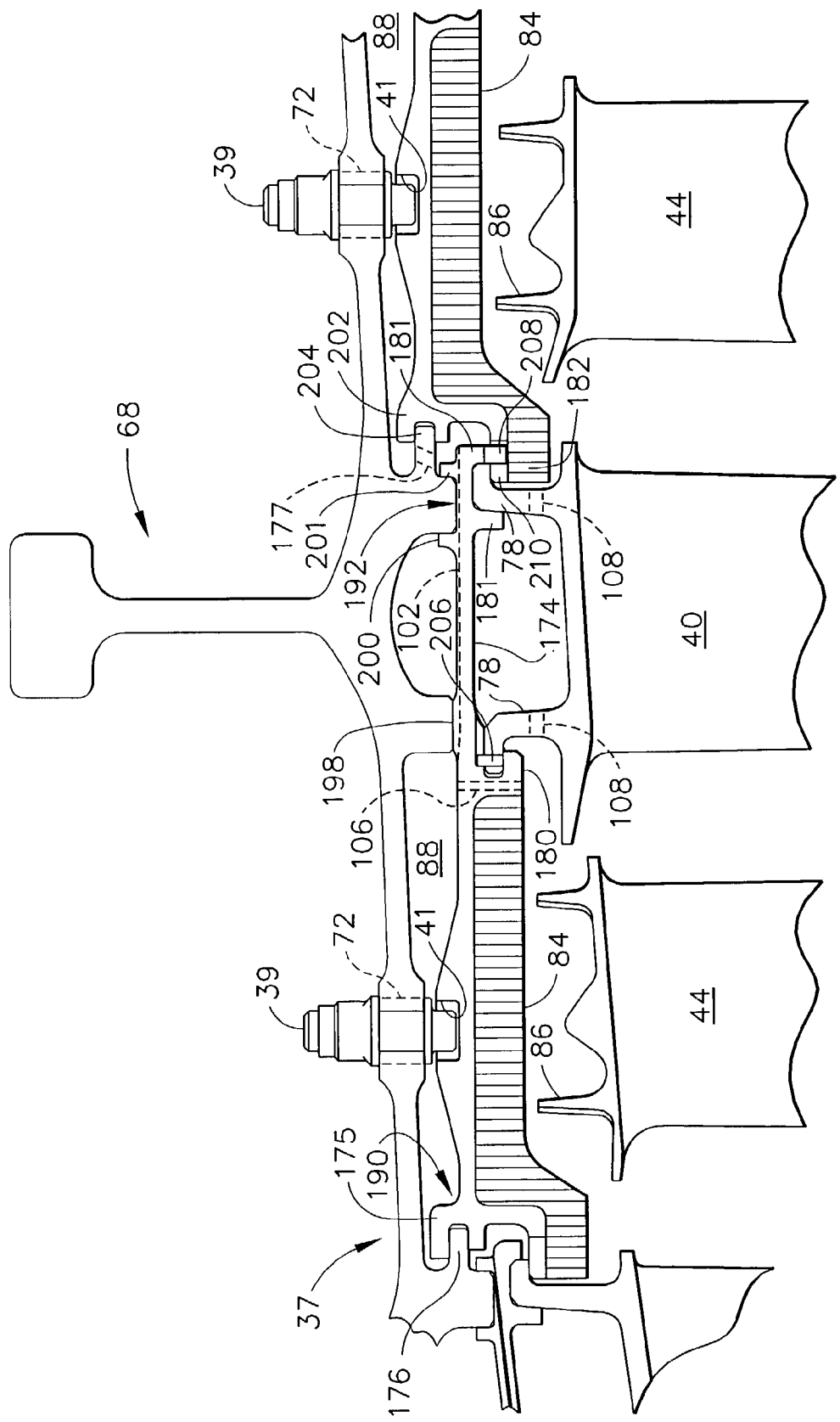
FIG. 6 is an enlarged schematic view of a portion of the outer spool of the counter-rotating turbine of FIG. 2, showing details of an alternate configuration of the blade mounting structures.

FIG. 6 illustrates a different possible configuration of the blade attachment hardware. In this arrangement, the outer turbine blades 40 are attached to the outer spool 37 by arcuate blade hangers 174 which are similar in design to the blade hangers 74.

The blade hangers 174 differ from the previously described blade hangers 74 in that they are made integral with one of the sealing elements 84. In this particular example the blade hangers 174 are integral with the sealing elements that are located axially forward of the blade hangers 174. Each blade hanger 174 includes a forward boss 198 which is axially spaced away from aft bosses 200 and 201. The bosses bear against the radially inner surfaces of a ring portion 68 of the outer spool 37. Each blade hanger 174 has a forward end 190 and an aft end 192. The forward end 190 is secured to the outer spool 37 by a circumferential hanger mounting rail 175 which engages a circumferential mounting hook 176 formed in the outer spool 37. The aft end 192 is secured to the outer spool 37 by a flange 182 which extends from the adjacent sealing element 84.

The outer turbine blades 40 are attached to the blade hangers 174. In the illustrated example, the outer turbine blades 40 include fore and aft circumferential hooks 78 which are received, respectively, in a circumferential forward rail 180 and a pair of axially spaced-apart circumferential aft rails 181 formed in the blade hangers 174. The aft circumferential hook 78 is secured to the aft rails 181 by the flange 182.

The sealing element 84 that is located aft of the blade hanger 174 is attached to the outer spool 37 by a circumferential mounting rail 202 that engages a circumferential mounting hook 204 formed in the outer spool 37. A plurality of holes 177 may be formed through the mounting hook 204 in order to allow cooling air flow from the pocket 88 to the blade hanger 174.

A plurality of longitudinally extending slots 102 are formed through the forward boss 198, the aft bosses 200 and 201, and the radially outer surface of the blade hanger 174. In the illustrated example the depth of the slots 102 in the radial direction is sufficient to form a flow passage between the outer spool 37 and the blade hanger 174. A plurality of generally radially extending cooling holes 106 are formed through the thickness of the blade hanger 74 just forward of the forward boss 198. These cooling holes 106 allow the passage of cooling air flow from the annular pockets 88 to the outer ends of the outer turbine blades 40.

Provisions may also be made for transferring torque loads from the outer turbine blades 40 to the blade hangers 174 and the sealing elements 84. For example, a plurality of radially extending torque pins 206 may be installed through the forward blade hooks 78 and the blade hanger 174. Also, a tab 208 may extend from the blade hanger 174 and be received in a slot 210 in the sealing element 84 to transfer torque thereto.

In operation, cooling air from an appropriate source (not shown), such as compressor bleed air, is provided to the annular cavity 46 through the supply pipes 64 as shown by the arrows marked A in FIG. 2. The cooling air then flows into the annular pockets 88 between the sealing elements 84 and the outer spool 37 (see arrows marked B). A portion of the cooling air flow is admitted through the slots 102, and the cooling holes 106 in the blade hangers 74 or 174, and then flows past the ring portions 68 and the radially outer ends of the outer turbine blades 40 to provide cooling, as indicated by the arrows labeled C. Cooling passages 108 (see FIG. 3) may also be provided in the hooks 78 of the outer turbine blades 40 to allow cooling air flow therethrough. The spent cooling air then exits into the working gas flowpath 62 to join the combustion gases flowing past the low pressure turbine 34. Some of the cooling air flow flows past the outer spool 37 to the forward and aft seals 50 and 56, which allow controlled leakage into the working gas flowpath 62 as indicated by the arrows labeled D.

The cooling air flow is maintained at an adequately high pressure above the working gas flowpath air pressure to avoid ingestion of hot gases into the spaces outside of the working gas flowpath 62, while at the same time avoiding excessive purge flow into the working gas flowpath 62. This is done by selecting the size, number, and location of the inlet ports 66, inlet holes 72, cooling holes 106 and slots 102, and the clearances between adjacent rotor components, in a known manner. For example, the amount of cooling flow may be chosen to avoid excessive differential thermal growth between the outer rotor 38 and inner rotor 42, which would cause excessive leakage between the two rotors, thus increasing the cooling air supply requirement. This optimization of the purge flow levels keeps flow requirements to a minimum, thus improving operating efficiency of the engine 10.

An important feature of the invention is the use of a double walled configuration formed by the outer spool 37 and the sealing elements 84 and hangers 74 (or combined seal and hanger 174 configuration shown in FIG. 6). This double walled configuration provides the necessary thermal isolation from the flowpath gas, thereby maintaining acceptable operating temperatures for the rotating outer spool 37.

The foregoing has described a rotor system for a gas turbine engine having an outer rotor which includes an annular outer spool that comprises at least one ring portion of increased thickness with respect to the remainder of the outer spool, attached to a relatively thinner, axially extending arm portion. A plurality of outer turbine blades are attached to the ring portion of the outer spool and extend radially inwardly into a working gas flowpath of the engine. A casing surrounds the outer spool and defines an annular cavity between the casing and the outer spool, which is sealed by forward and aft brush seals at the forward and aft ends thereof. At least one inlet port is formed through the casing for admitting a flow of cooling air to the annular cavity. Means are provided for directing this cooling air flow to the ring portion of the outer spool. While specific embodiments of the present invention have been described, it will be apparent to those skilled in the art that various modifications thereto can be made without departing from the spirit and scope of the invention as defined in the appended claims.

What is claimed is:

1. A rotor system for a gas turbine engine, comprising: an outer rotor disposed about an axis, said outer rotor comprising an annular outer spool which includes at least one ring portion of increased thickness with respect to the remainder of said outer spool, said ring portion being attached to a relatively thinner, axially extending arm portion; a plurality of outer turbine blades which are attached to said ring portion of said outer spool and extend radially inwardly into a working gas flowpath of said engine, a casing surrounding said outer rotor and defining an annular cavity between said casing and said outer rotor, said casing having at least one inlet port formed therethrough for admitting a flow of cooling air to said annular cavity; a forward seal disposed at a forward end of said annular cavity; an aft seal disposed at an aft end of said annular cavity; and means for directing said flow of cooling air from said annular cavity to said ring portion of said outer spool, wherein at least one open inlet hole is formed through said arm portion of said outer spool such that said outer turbine blades are in fluid communication with said annular cavity.

2. The rotor system for a gas turbine engine of claim 1 further comprising a plurality of arcuate blade hangers, wherein said blade hangers are attached to said ring portion of said outer spool and said blades are attached to said blade hangers, and at least one cooling passage is formed in each of said blade hangers, said cooling passage being in fluid communication with said ring portion and said annular cavity.

3. The rotor system for a gas turbine engine of claim 2 wherein each of said blade hangers includes axially spaced-apart circumferential bosses extending from a radially outer surface thereof, at least one of said bosses having at least one axially extending slot formed therethrough.

4. The rotor system for a gas turbine engine of claim 2 further comprising an arcuate sealing element disposed radially inward of said outer spool in axial alignment with said spool arm portion, so as to define an annular pocket between said sealing element and said outer spool, wherein said at least one inlet hole in said outer spool is in fluid communication with said annular cavity and said annular pocket.

5. The rotor system for a gas turbine engine of claim 4 wherein at least one of said blade hangers is integral with said sealing element.

6. The rotor system for a gas turbine engine of claim 2 wherein each of said blade hangers includes at least one cooling hole formed therethrough, said cooling hole being in fluid communication with said annular cavity and said working gas flowpath.

7. The rotor system for a gas turbine engine of claim 1 further comprising an inner rotor disposed about said axis, said inner rotor including at least one circumferential array of inner turbine blades which extend radially outwardly into said working gas flowpath.

8. A rotor system for a gas turbine engine comprising: an inner rotor disposed about an axis, said inner rotor including a plurality of stages of inner turbine blades which extend radially outwardly into a working gas flowpath; an outer rotor disposed around said axis, said outer rotor comprising an outer spool including a plurality of stages of outer turbine blades which extend radially inwardly into said working gas flowpath, wherein said stages of said inner and outer blades are alternated axially; an outer casing surrounding said outer rotor and defining an annular cavity between said outer casing and said outer rotor; a forward seal disposed at a forward end of said annular cavity; an aft seal disposed at an aft end of said annular cavity; and means for transferring a flow of cooling air from said annular cavity to selected portions of said outer rotor, wherein at a plurality of open inlet holes are formed through said outer spool such that said outer turbine blades are in fluid communication with said annular cavity.

9. The rotor system for a gas turbine engine of claim 8 wherein said outer spool is a generally annular component including at least one ring portion of increased thickness with respect to the remainder of said outer spool, said ring portion being attached to a relatively thinner, axially extending arm portion.

10. The rotor system for a gas turbine engine of claim 9 further comprising a plurality of arcuate blade hangers, wherein said blade hangers are attached to said ring portion of said outer spool and said blades are attached to said blade hangers, and at least one cooling passage is formed in each of said blade hangers, said cooling passage being in fluid communication with said ring portion and said annular cavity.

11. The rotor system for a gas turbine engine of claim 10 wherein each of said blade hangers includes axially spaced-apart circumferential bosses extending from a radially outer surface thereof, each of said bosses having at least one axially extending slot formed therethrough.

12. The rotor system for a gas turbine engine of claim 11 further comprising an arcuate sealing element disposed radially inward of said outer spool in axial alignment with said spool arm portion so as to define an annular pocket between said sealing element and said outer spool, wherein said at least one inlet hole in said outer spool is in fluid communication with said annular cavity and said annular pocket.

13. The rotor system for a gas turbine engine of claim 12 wherein at least one of said blade hangers is integral with said sealing element.

14. The rotor system for a gas turbine engine of claim 10 wherein each of said blade hangers includes at least one cooling hole formed therethrough, said cooling hole being in fluid communication with said annular cavity and said working gas flowpath.

\* \* \* \* \*